(12) United States Patent
Newport et al.

(10) Patent No.: US 6,585,227 B2
(45) Date of Patent: Jul. 1, 2003

(54) ROLLER SCREW ACTUATOR FOR SUBSEA CHOKE OR MODULE

(75) Inventors: Johnny E. Newport, Houston, TX (US); Todd J. Mosley, Houston, TX (US)

(73) Assignee: Cooper Cameron Corporation, Houston, TX (US)

( * ) Notice: Subject to any disclaimer, the term of this patent is extended or adjusted under 35 U.S.C. 154(b) by 119 days.

(21) Appl. No.: 09/915,796

(22) Filed: Jul. 26, 2001

(65) Prior Publication Data

US 2003/0020034 A1 Jan. 30, 2003

(51) Int. Cl.[7] .............................................. F16K 31/12
(52) U.S. Cl. ...................... 251/58; 251/256; 74/424.92; 74/25
(58) Field of Search ................ 251/58, 265; 74/424.89, 74/424.91, 424.92, 25

(56) References Cited

U.S. PATENT DOCUMENTS

| | | | | |
|---|---|---|---|---|
| 2,883,144 A | * | 4/1959 | Kendig | 251/58 |
| 2,975,976 A | * | 3/1961 | Smith et al. | 251/58 |
| 3,450,382 A | * | 6/1969 | Calim | 251/58 |
| 3,542,331 A | * | 11/1970 | Canalizo | 251/58 |
| 4,650,151 A | * | 3/1987 | McIntyre | 251/14 |
| 4,741,250 A | | 5/1988 | Weyer | 92/33 |
| 4,744,386 A | * | 5/1988 | Frazer | 251/63.6 |
| 4,748,866 A | * | 6/1988 | Weyer | 74/424.92 |
| 4,881,419 A | | 11/1989 | Weyer | 74/89.15 |
| 4,971,099 A | * | 11/1990 | Cyvas | 251/282 |
| 5,027,667 A | | 7/1991 | Weyer | 74/89.15 |
| 6,113,063 A | * | 9/2000 | Takahashi et al. | 251/58 |
| 6,231,027 B1 | | 5/2001 | Baker et al. | 251/58 |

OTHER PUBLICATIONS

"*Planetary Roller Screws, Series RGT*", INA Bearing Company, 1989, pp. 4,5 and 21.

* cited by examiner

*Primary Examiner*—Ehud Gartenberg
*Assistant Examiner*—John Bastianelli
(74) *Attorney, Agent, or Firm*—Michael P. Hartmann; Peter A. Bielinski (57) ABSTRACT

An actuator for use with a subsea choke or similar apparatus is disclosed. The actuator uses a planetary roller screw mechanism to allow greater control of the torque output while allowing a fast closing of the choke when well conditions require so. A handle is positioned on one end of the actuator housing for manipulation of the actuator housing by a remotely operated vehicle, when required. A pressure responsive axially reciprocable piston is positioned around the driven shaft and controls movement thereof. Other embodiments show the actuator controlling the position of the cage in a cage type choke. A final embodiment shows the actuator configured for use on a subsea tree.

15 Claims, 8 Drawing Sheets

ROLLER SCREW ACTUATOR FOR SUBSEA CHOKE OR MODULE

BACKGROUND OF THE INVENTION

1. Field of the Invention

This invention is generally related to an actuator for operating a wellhead choke using a planetary roller screw. More particularly, the invention provides apparatus for operating a choke in a subsea environment that performs the fast close function of a hydraulic motor while giving control similar to that of a stepping actuator in a single compact unit.

2. General Background

The ongoing search for hydrocarbons in offshore locations to satisfy the world's increasing need for energy has led to the need to drill for and produce these hydrocarbons in increasingly deeper waters. This has led to the need for production trees suitable for use in a subsea environment. These subsea trees require valves and chokes that can be operated remotely with a minimum of diver intervention. In the case of deep water trees where diver intervention is not possible, the only alternative is to use remotely operated vehicles (ROVs) to provide intervention capabilities. Therefore, it is necessary that any such actuator for a choke or valve be operable by normal hydraulic means while allowing for override by an ROV.

Current technology often uses a hydraulic torque motor when it is desired to have a fast closing operation. These hydraulic torque motors suffer from a number of deficiencies. Among these are the motors require a large amount of hydraulic fluid to operate and the amount and type of fluid required may vary according to the motor design and the required output torque for varying loads, Additionally, the running torque is much higher than the starting torque which can cause problems at stall conditions at the end of the travel. The roller screw actuator of the present invention overcomes these deficiencies.

2. Description of Related Art

U.S. Pat. Nos. 4,741,250; 4,881,419; and 5,027,667 to P. P. Weyer show hydraulically and spring powered actuators using various rollers.

A high torque rotating actuator suitable for subsea use is disclosed in U.S. Pat. No. 6,231,027 B1 to G. S. Baker et al.

SUMMARY OF THE INVENTION

The present invention comprises an actuator for use with a subsea choke or similar apparatus. The actuator uses a planetary roller screw mechanism to allow greater control of the torque output while allowing a fast closing of the choke when well conditions require so. The actuator includes a two part housing secured in abutting relationship by bolts. Centrally disposed in the actuator housing is a driven or output shaft that is supported in support assemblies at each end. These support assemblies include support and thrust bearings that restrain the driven shaft from axial movement while allowing rotation. A handle is positioned on one end of the actuator housing for manipulation of the actuator housing by a remotely operated vehicle, when required. A plurality of anti-rotation keys are positioned on the opposite end of the actuator housing. A pressure responsive axially reciprocable piston is positioned around the driven shaft. The piston has a counterbore and a bore therethrough.

A plurality of spindle shafts are disposed circumferentially around the counterbore of the piston. The plurality of spindle shafts are helically threaded and in threaded engagement with a complementary helical thread on the central driven shaft. An anti-rotation means is disposed between the piston and the actuator housing to prevent rotation of the piston as it is reciprocated. The support assemblies positioned on each end of the central driven shaft are coupled to the ends of the central driven shaft by mating splines. The support assembly adjacent the end of the actuator housing supporting the plurality of anti-rotation keys includes an extension extending through a bore in the end of the actuator housing. The extension includes a splined end having a splined adapter thereon having an internal hex on its outer end.

The axially reciprocable piston includes a annular flange formed thereon that is positioned in a counterbore in the actuator housing. The annular flange and the counterbore have annular seals positioned thereon to form an annular chamber in which the piston reciprocates. The actuator housing includes pressure ports at either end of the annular chamber to supply pressurized fluid for reciprocation of the piston. Another embodiment showing the actuator controlling the position of a choke cage is shown along with the actuator as used on a subsea tree.

A principal object of the present invention is to provide an actuator for a choke that allows fast closing of the choke while giving control of the positioning of flow control element approximating that of a stepping actuator.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein.

DESCRIPTION OF THE PREFERRED EMBODIMENTS

Figures 1, 3:
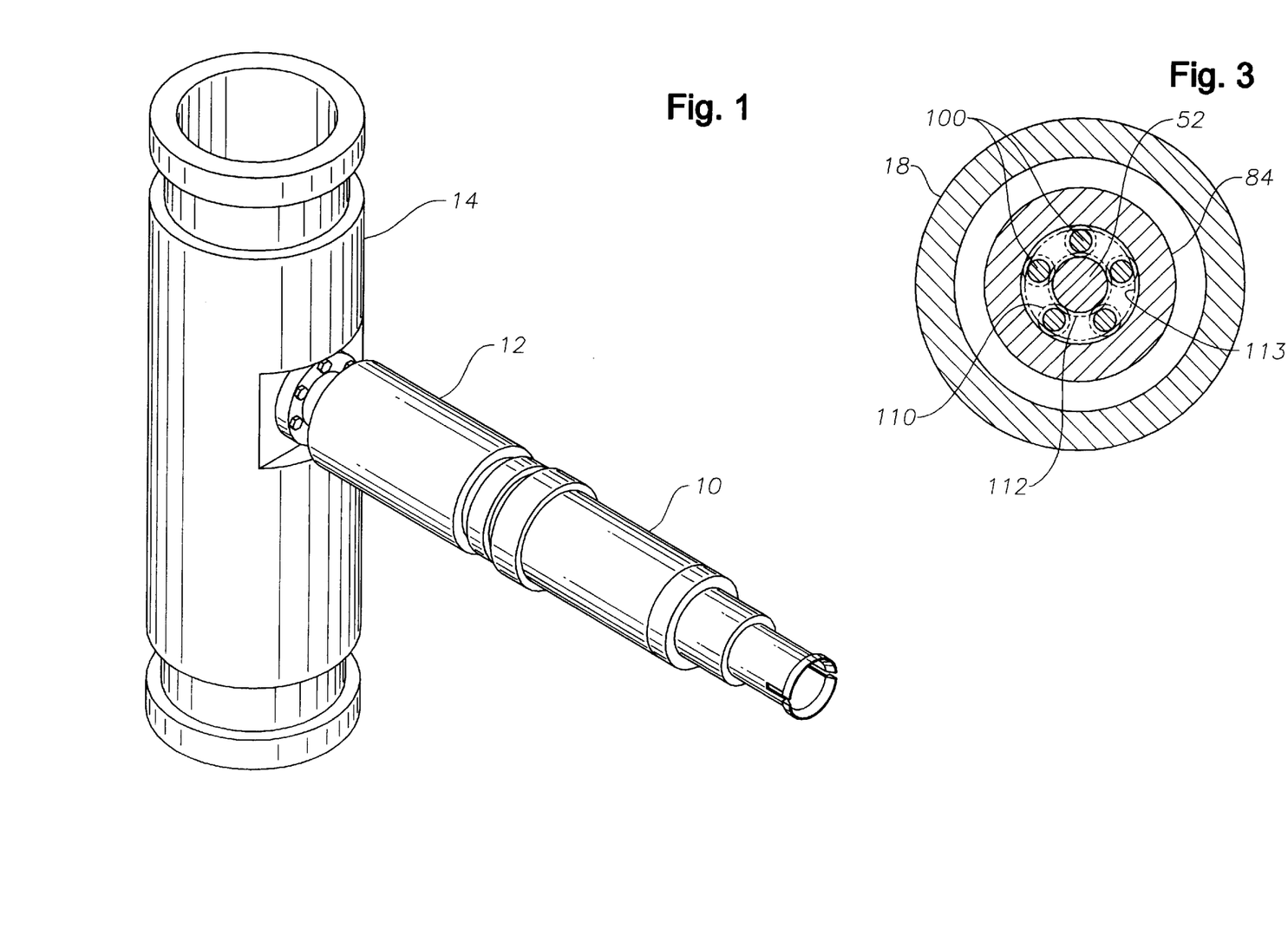
FIG. 1 is a perspective view of a wellhead housing extension with an actuator of the present invention and a subsea choke positioned thereon.
FIG. 3 is an sectional view, taken along lines 3—3 of FIG. 2.

With reference to the drawings, and particularly to FIG. 1, a perspective view of an actuator 10 embodying the present invention is shown in combination with subsea choke 12 attached to wellhead housing extension 14. Alternatively, choke 12 may be replaced by a primary actuator for a choke or valve. Wellhead housing extension 14, well known to those of ordinary skill in the art, is typically positioned on a subsea tree with production fluid being flowed through choke 12.

Figure 2A:
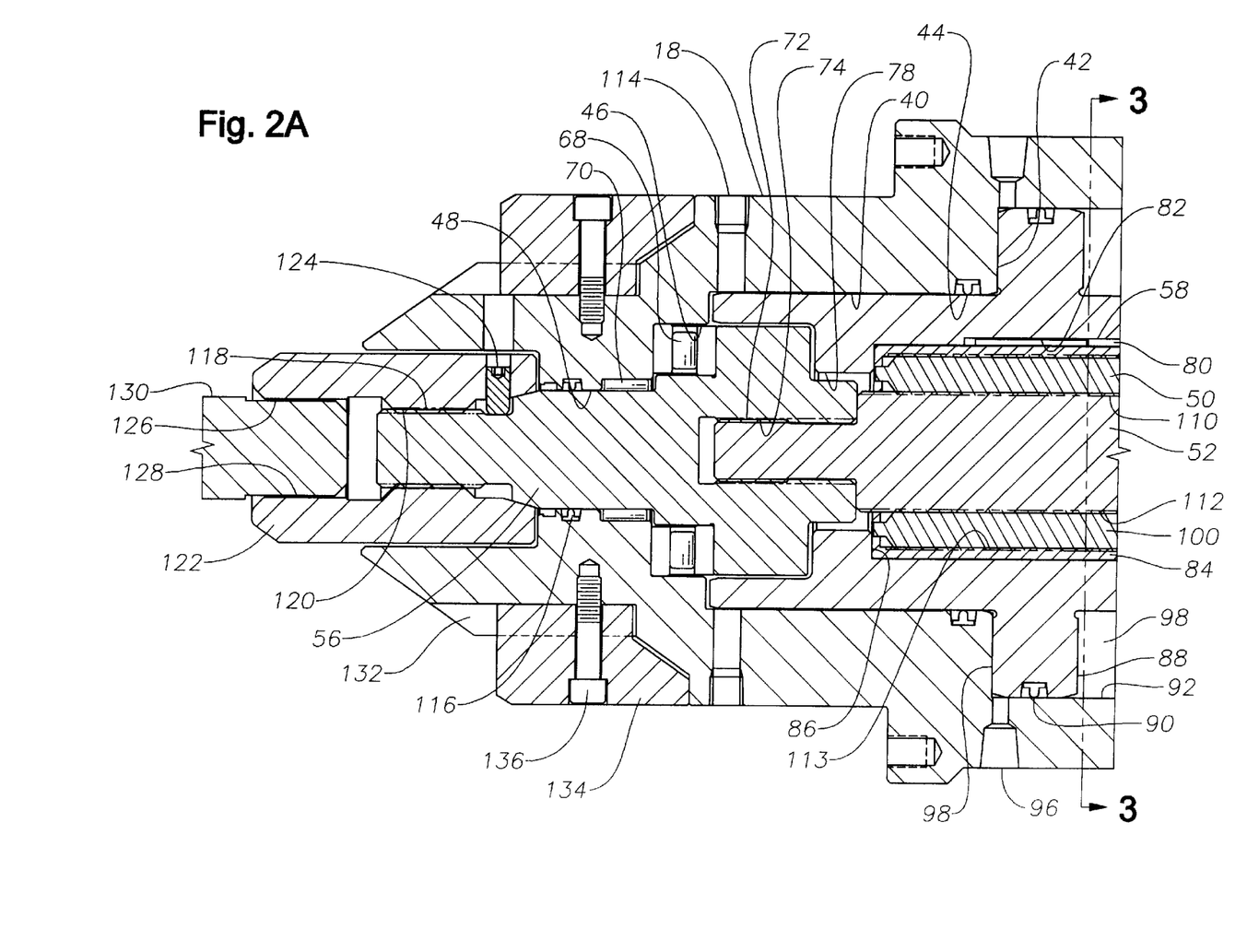
FIGS. 2A and 2B are a sectional view of the actuator of the present invention.
Figure 2B:
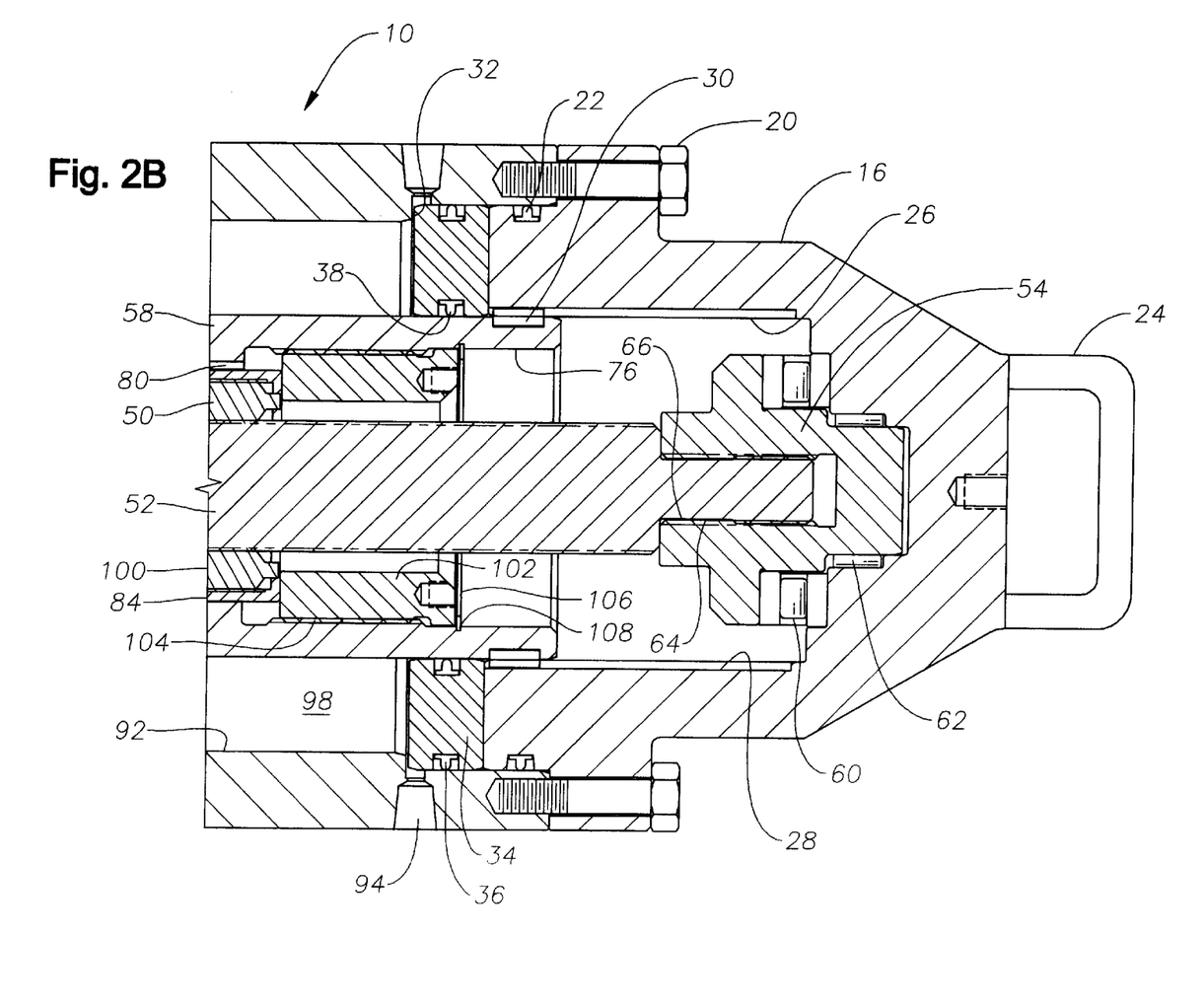

FIGS. 2A and 2B show in greater detail the construction of actuator 10. Actuator 10 is a generally cylindrical member with upper actuator housing 16 secured to lower actuator housing 18 by suitable securing means as bolts 20. Suitable sealing means as elastomeric seal 22 seals therebetween. Upper actuator housing 16 has a closed end with ROV handle 24 positioned thereon for purposes to be explained hereinafter. The interior of upper actuator housing 16 has counterbore 26 machined therein. Keyway 28 is milled in counterbore 26 and receives anti-rotation key 30 therein.

Lower actuator housing 18 has shoulder 32 formed on its interior, adjacent upper actuator housing 16. Shoulder 32 has seal retainer 34 resting thereon and axially restrained by upper actuator housing 16 when upper actuator housing 16 is secured to lower actuator housing 18. Seal retainer has seal rings 36 and 38 on its exterior and interior, respectively, to form a pressure chamber in a manner to be explained hereinafter.

Lower actuator housing 18 has reduced bore 40 formed at its middle to provide stop shoulder 42. Seal ring 44 is positioned in reduced bore 40. Lower actuator housing 18 terminates with stepped bores 46 and 48 adjacent reduced bore 40. Driven member 50 is centrally disposed in actuator 10 and includes central driven shaft 52 that is supported by support assemblies 54 and 56 at either end. Driving member 58 is positioned in the annulus between driven member 50 and actuator housings 16 and 18. Support assembly 54 is positioned in upper actuator housing 16 and includes thrust bearings 60 and support bearings 62 to axially restrain and allow rotation of central driven shaft 52. Splines 64 on central support shaft 52 and splines 66 in support assembly 54 transmit rotation therebetween. In a similar manner, support assembly 56 is positioned in lower actuator housing 18 and includes thrust bearings 68 and support bearings 70 to axially restrain and allow rotation of central driven shaft 52. Splines 72 on central support shaft 52 and splines 74 in support assembly 56 transmit rotation therebetween.

Driving member 58 is a generally cylindrical member with counterbore 76 and bore 78 therethrough. Keyway 80 is milled in counterbore 76 and receives anti-rotation key 82 therein. Anti-rotation key 82 mates with carrier housing 84 to prevent rotation between driving member 58 and carrier housing 84. Carrier housing 84 seats on shoulder 86 of driving member 58. Driving member 58 has annular flange 88 formed on its exterior with seal ring 90 positioned thereon that seals against bore 92 of lower actuator housing 18. Pressure ports 94 and 96 are formed in the wall of lower actuator housing 18 to allow introduction of pressurized fluid. Thus, pressure chamber 98 is formed between seal rings 36 and 38 on seal retainer 34 and seal ring 44 sealing against driving member 58. Since seals 38 and 44 seal on the same diameter and thereby having the same pressure area, no volume compensation apparatus is required. Annular flange 88 acts as a reciprocable piston when pressurized fluid is introduced into pressure chamber 98 through pressure ports 94 and 96.

Carrier housing 84 has a plurality of spindle shafts 100 disposed circumferentially around its periphery. Carrier housing 84 is retained within counterbore 76 of driving member 58 by retainer nut 102 that engages threads 104 on the interior of driving member 58. Snap ring 106 engages groove 108 of driving member 58 to ensure retainer nut 102 does not disengage. Spindle shafts 100 have helical thread 110 formed on their exterior and engage complementary helical thread 112 formed on the exterior of driven shaft 52 and complementary interior helical thread 113 on the interior of carrier housing 84 simultaneously. Lubrication port 114 is formed in lower actuator housing 18 adjacent support assembly 56 to inject lubricant. Seal ring 116 is positioned in bore 48 to retain this lubricant.

The outer end of support assembly 56 extends through bore 48 and has splines 118 formed thereon to engage complementary splines 120 of drive adapter 122. Drive adapter 122 has set screw 124 radially disposed therein to engage the outer end of support assembly 56 and ensure splines 118 and 120 remain engaged. The outer end of drive adapter 122 has internal hex 126 formed therein to engage complementary hex 128 of choke stem 130 (partially shown). Although items 126 and 128 are shown as hex shaped, other suitable shapes such as a square could be used for torque transmission therebetween without departing from the scope of the present invention. Adjacent to drive adapter 122 on the exterior of lower actuator housing 18, slots 132 are milled and receive mating drive keys 134. Drive keys 134 are secured within slots 132 by cap screws 136.

A typical method of use for the embodiment of FIG. 2 would be as follows. Actuator 10 would be positioned adjacent a valve or choke to be actuated by a ROV utilizing ROV handle 24. Drive adapter 122 would engage a mating hex on the choke or valve. Pressurized fluid would be supplied through a control system, well known to those of ordinary skill in the art, to either pressure port 94 or 96, depending on the direction of rotation desired. Assuming that pressurized fluid is supplied to port 96 for the configuration shown in FIG. 2, the resulting pressure will act on annular flange 88 between seals 44 and 90 and urge annular flange 88 of driving member 58 toward seal retainer 34. As driving member 58 thus moves, carrier housing 84 is moved also along with spindle shafts 100. As spindle shafts 100 engage central driven shaft 52 through helical threads 110 and 112, driving member 58 is anti-rotated with respect to upper actuator housing 16 (and thus actuator 10) by key 30 and driving member 58 is anti-rotated also with respect to carrier housing 84 by key 82. With driving member 58 thus anti-rotated, as carrier housing 84 translates, the rotation of spindle shafts 100 is transmitted to central shaft 52 thereby "driving" central shaft 52. The rotation of central shaft 52 is transmitted through drive adapter 122 to choke or valve stem 130. If reversal of the direction of rotation is desired, pressurized fluid is applied to port 94 to reverse the direction of driving member 58. It is important to note that movement of driving member 58 and thus the output rotation of driven central shaft 52 can be controlled with considerable precision by controlling the volume of pressurized fluid supplied to ports 94 or 96. This volume can be controlled with considerable precision through the control system discussed previously. Additionally, driving member 58 can be driven to any position along its travel, stopped, and the direction of travel reversed simply by controlling the volume of pressurized fluid supplied and to which port. Furthermore, it becomes necessary to rapidly close a choke or valve, a large volume of pressurized fluid may be supplied to the appropriate port and the closing is accomplished rapidly as driving member 58 is essentially a positive displacement pump with no fluid lost. It is this ability to control driving member 58 and driven central shaft 52 with such precision that allows actuator 10 to be used as shown in the second embodiment of FIG. 4.

Figure 4A:
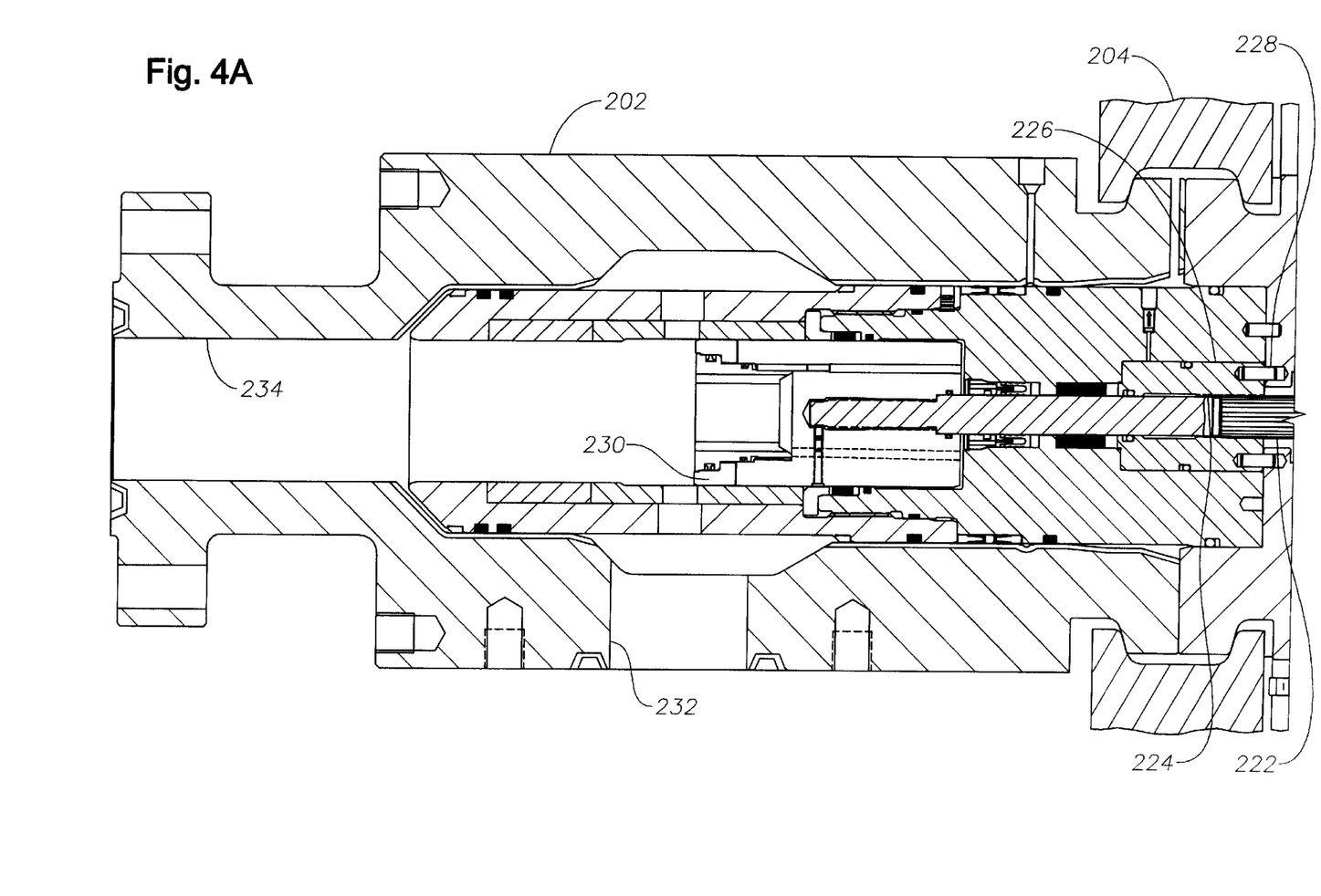
FIGS. 4A and 4B are a sectional view of the actuator of the present invention in combination with a choke.
Figure 4B:
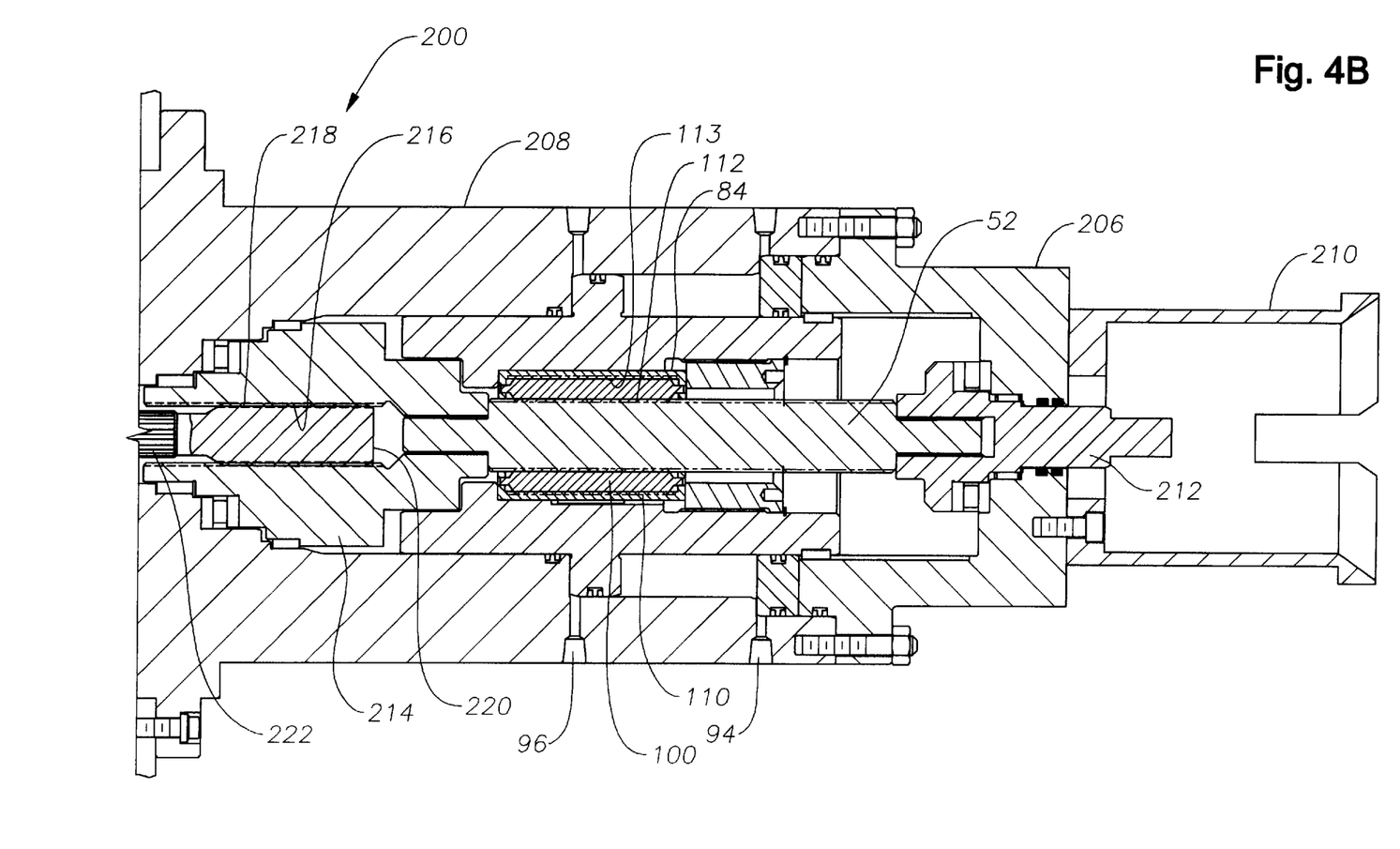

A second embodiment of the present invention showing its use to operate a cage style choke is shown in FIGS. 4A and 4B. Such cage style chokes are well known in the oilfield industry and a typical example is shown in U.S. Pat. No. 5,086,808 to R. G. Pettus. Those items that are the same as in the first embodiment retain the same numerical designation. Actuator 200 is secured to choke 202 by clamp 204 (shown partially). As in the first embodiment, actuator 200 includes upper actuator housing 206 and lower actuator housing 208. ROV bucket 210 is secured to upper actuator housing 206 to provide a manual override, when it is necessary. Central driven shaft 52 is carried in support assemblies 212 and 214. Support assemblies 212 and 214 function as in the previous embodiment, supporting and permitting rotation of driven shaft 52. Support assembly 212 has internal thread 216 at its outer end that engages mating external thread 218 of choke stem 220. Splines 222 are formed on the middle portion of choke stem 220 and engage mating splines 224 on adapter sleeve 226. Adapter sleeve 226 is anti-rotated with respect to choke 202 by dowel pins 228. Choke stem 220 is connected to cage 230 and is moved linearly and will thereby control well fluid flow between inlet port 232 and outlet port 234.

When it is desired to operate choke 202 by positioning cage 230, actuator 200 is supplied by supplying pressurized fluid to either port 94 or 96, depending on the direction cage 230 is moved. When pressurized fluid is supplied thusly, rotation of driven shaft 52 occurs as in the first embodiment. In this embodiment, however, when driven shaft 52 rotates support assembly 214, threads 216 and 218 are engaged and therefore try to impart rotation to choke stem 220. As choke stem 220 is anti-rotated by the interaction of splines 222 and 224, adapter sleeve 226 and dowel pins 228, choke stem 220 is forced to translate linearly and thereby allow positioning of cage 230. As in the first embodiment, actuator 200 allows positioning of cage 230 with considerable precision while retaining the ability to rapidly move cage 230 its entire range of travel.

Figure 5A:
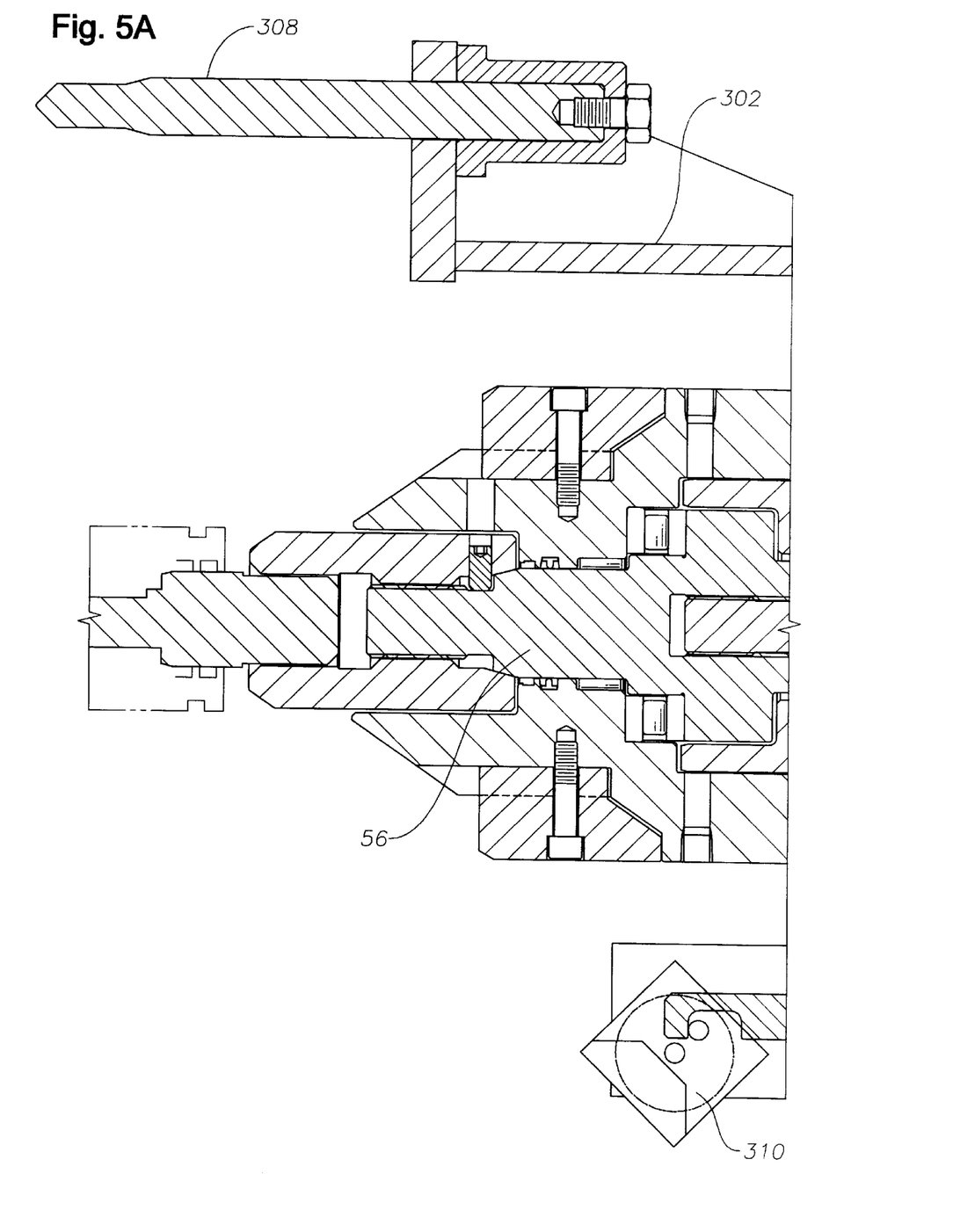
FIGS. 5A, 5B and 5C are a sectional view of the actuator of the present invention on a mounting plate for use on a subsea tree.
Figure 5B:
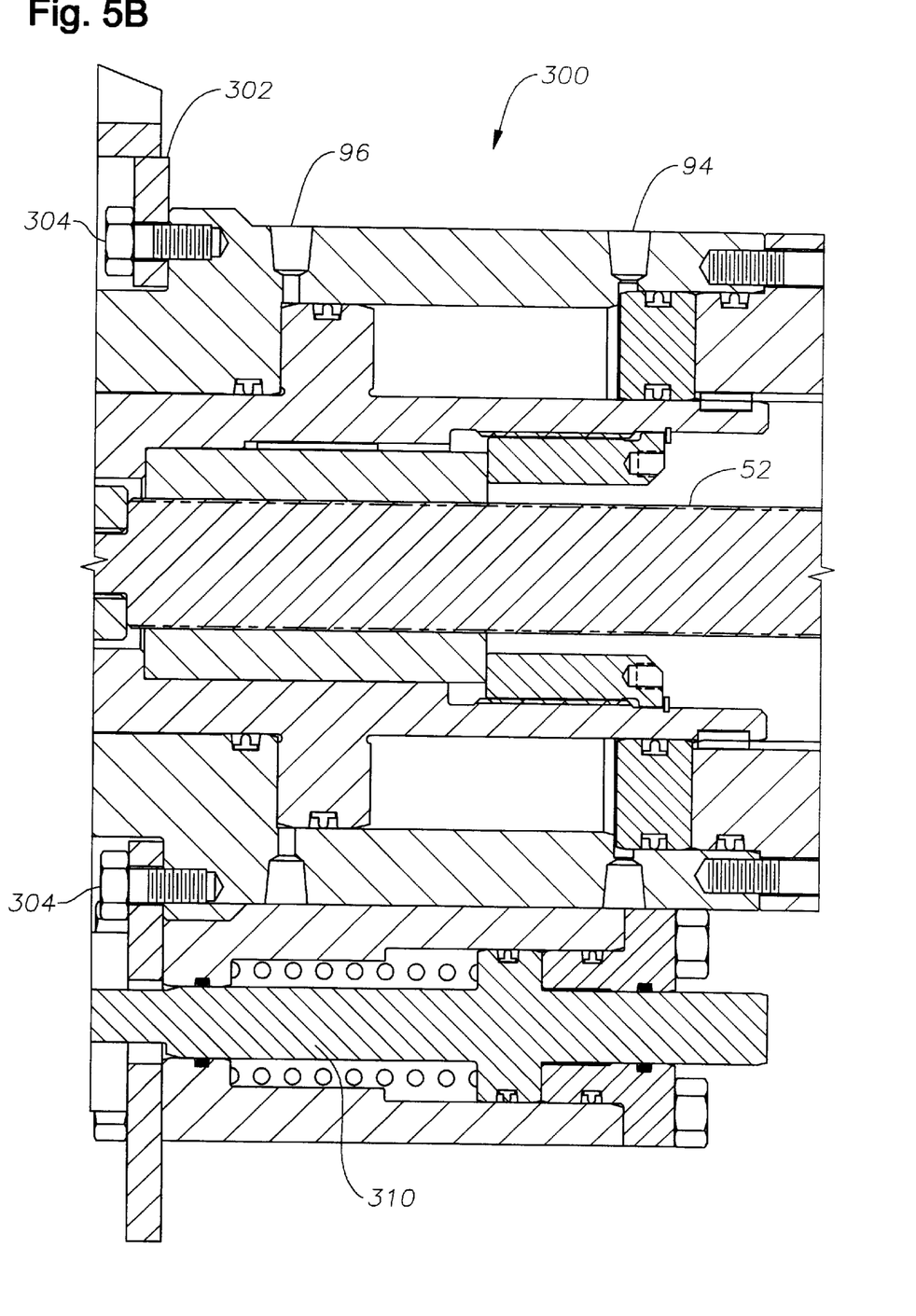
Figure 5C:
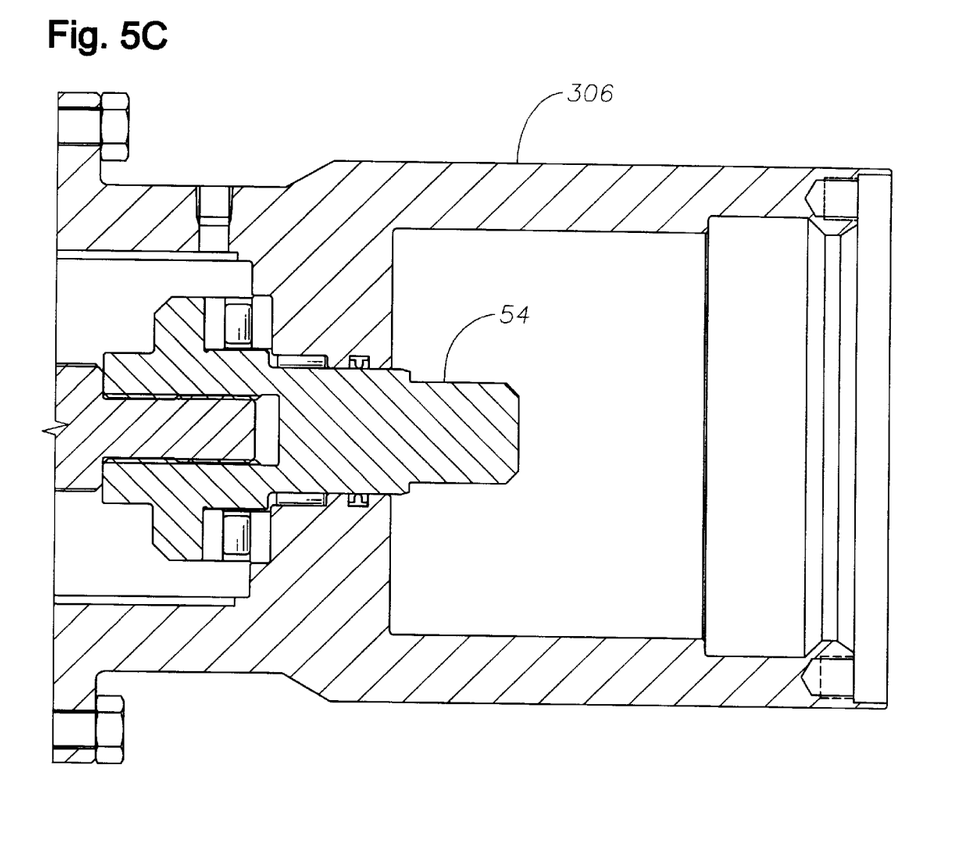

A third embodiment of the present invention showing its use on a mounting plate for use on a subsea tree is shown in FIGS. 5A, 5B and 5C. Those items that are the same as in the first embodiment retain the same numerical designation. Actuator 300 is secured to mounting plate 302 by suitable means as bolts 304. Actuator 300 includes ROV bucket 306 as in the second embodiment. Secured to mounting plate 302 is guide pin 308 used to orient actuator 300 when it is deployed onto a subsea tree in a manner well known to those of ordinary skill in the art. Delay valve 310 is used to control fast close operation of actuator 300 in conjunction with a primary actuator such as item 12. In all other respects, actuator 300 functions as in the first embodiment.

The construction of our roller screw actuator for a subsea choke will be readily understood from the foregoing description and it will be seen that we have provided an actuator that performs the fast close function of a hydraulic motor while giving control similar to that of a stepping actuator in a single compact unit. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A roller screw actuator for a subsea choke or module, said actuator comprising:
   an actuator housing;
   a driven member, said driven member centrally disposed in said actuator housing and supported therein by support assemblies;
   said driven member includes a central driven shaft; and,
   a pressure responsive driving member coupled to said driven member, whereby axial movement of said pressure responsive driving member imparts rotational movement to said driven member said pressure responsive driving member includes an axially reciprocable piston formed thereon; said pressure responsive driving member includes a plurality of spindle shafts disposed circumferentially around said central driven shaft; said plurality of spindle shafts are helically threaded and in threaded engagement with a complementary helical thread on said central driven shaft; and, an anti-rotation means disposed between said pressure responsive driving member and said actuator housing to prevent rotation of said pressure responsive driving member as it is reciprocated.

2. A roller screw actuator for a subsea choke or module according to claim 1, wherein:
   said plurality of spindle shafts are axially restrained within said counterbore of pressure responsive driving member by a carrier housing; and,
   said helical thread on said spindle shafts engage a complementary internal thread on said carrier housing.

3. A roller screw actuator for a subsea choke or module according to claim 2, wherein:
   said support assemblies are positioned on each end of said central driven shaft;
   said support assemblies are coupled to said ends of said central driven shaft by mating splines; and,
   said support assemblies include thrust and support bearings positioned thereon to axially restrain said central driven shaft and allow rotational movement thereof.

4. A roller screw actuator for a subsea choke or module according to claim 3, wherein:
   said support assembly adjacent said end of said actuator housing supporting said plurality of anti-rotation keys includes an extension extending through a bore in said end of said actuator housing;
   said extension including a splined end having a splined adapter thereon; and,
   said splined adapter having an internal configuration on its outer end for coupling with and transmitting torque to a stem.

5. A roller screw actuator for a subsea choke or module according to claim 4, wherein:
   said axially reciprocable piston includes a annular flange formed thereon, said annular flange positioned in a counterbore is said actuator housing;
   said annular flange and said counterbore having annular seals positioned thereon to form an annular chamber in which said axially reciprocable piston reciprocates; and,
   said actuator housing including pressure ports at either end of said annular chamber to supply pressurized fluid for reciprocation of said piston and a plurality of anti-rotation keys positioned on one end of said actuator.

6. A roller screw actuator in combination with a subsea choke, said combination comprising:
   a subsea choke having an inlet, an outlet and a axially moveable flow restricting member therebetween to regulate flow;
   an actuator housing secured to said subsea choke;
   a driven member, said driven member centrally disposed in said actuator housing and supported therein by support assemblies;
   a pressure responsive driving member coupled to said driven member whereby axial movement of said pressure responsive driving member imparts rotational movement to said driven member;

said rotational movement of said driven member cooperating with a stem on said subsea choke flow restricting member to control axial movement and positioning of said flow restricting member; and, an adapter positioned on one end of said actuator housing for manipulation of said driven member said pressure responsive driving member is an axially reciprocable piston; said driven member includes a central driven shaft; said pressure responsive driving member includes a plurality of spindle shafts disposed circumferentially around said central driven shaft; said plurality of spindle shafts are helically threaded and in threaded engagement with a complementary helical thread on said central driven shaft; and, an anti-rotation means disposed between said pressure responsive driving member and said actuator housing to prevent rotation of said pressure responsive driving member as it is reciprocated.

7. A roller screw actuator in combination with a subsea choke, said combination according to claim 6, wherein:

said plurality of spindle shafts are axially restrained within said counterbore of pressure responsive driving member by a carrier housing; and, said helical thread on said spindle shafts engage a complementary internal thread on said carrier housing.

8. A roller screw actuator in combination with a subsea choke, said combination according to claim 7 wherein:

said support assemblies are positioned on each end of said central driven shaft;

said support assemblies are coupled to said ends of said central driven shaft by mating splines; and, said support assemblies include thrust and support bearings positioned thereon to axially restrain said central driven shaft and allow rotational movement thereof.

9. A roller screw actuator in combination with a subsea choke, said combination according to claim 8 wherein:

said support assembly adjacent said end of said actuator housing secured to said subsea choke includes an internal thread for engagement with a complementary external thread on a stem attached to said axially moveable flow restricting member; and, said stem including splines engaging mating splines on a splined adapter sleeve positioned in said choke, said splined adapter sleeve anti-rotated with respect to said choke.

10. A roller screw actuator in combination with a subsea choke, said combination according to claim 9 wherein:

said axially reciprocable piston includes a annular flange formed thereon, said annular flange positioned in a counterbore in said actuator housing;

said annular flange and said counterbore having annular seals positioned thereon to form an annular chamber in which said axially reciprocable piston reciprocates; and, said actuator housing including pressure ports at either end of said annular chamber to supply pressurized fluid for reciprocation of said piston.

11. A roller screw actuator for actuating a subsea choke on a subsea tree, comprising:

a mounting plate with a guide pin affixed thereto;

an actuator housing positioned on said mounting plate;

a driven member, said driven member centrally disposed in said actuator housing and supported therein by support assemblies;

a pressure responsive driving member coupled to said driven member whereby axial movement of said pressure responsive driving member imparts rotational movement to said driven member;

an adapter positioned on one end of said actuator housing for manipulation of said driven member housing; and, a plurality of anti-rotation keys positioned on the opposite end of said actuator said pressure responsive driving member is an axially reciprocable piston; said driven member includes a central driven shaft; said pressure responsive driving member includes a plurality of spindle shafts disposed circumferentially around said central driven shaft; said plurality of spindle shafts are helically threaded and in threaded engagement with a complementary helical thread on said central driven shaft; and, an anti-rotation means disposed between said pressure responsive driving member and said actuator housing to prevent rotation of said pressure responsive driving member as it is reciprocated.

12. A roller screw actuator for actuating a subsea choke on a subsea tree according to claim 11, wherein:

said plurality of spindle shafts are axially restrained within said counterbore of pressure responsive driving member by a carrier housing; and, said helical thread on said spindle shafts engage a complementary internal thread on said carrier housing.

13. A roller screw actuator for actuating a subsea choke on a subsea tree according to claim 12, wherein:

said support assemblies are positioned on each end of said central driven shaft;

said support assemblies are coupled to said ends of said central driven shaft by mating splines; and, said support assemblies include thrust and support bearings positioned thereon to axially restrain said central driven shaft and allow rotational movement thereof.

14. A roller screw actuator for actuating a subsea choke on a subsea tree according to claim 13, wherein:

said support assembly adjacent said end of said actuator housing supporting said plurality of anti-rotation keys includes an extension extending through a bore in said end of said actuator housing;

said extension including a splined end having a splined adapter thereon; and, said splined adapter having an internal configuration on its outer end for coupling with and transmitting torque to a stem.

15. A roller screw actuator for actuating a subsea choke on a subsea tree according to claim 14, wherein:

said axially reciprocable piston includes a annular flange formed thereon, said annular flange positioned in a counterbore in said actuator housing;

said annular flange and said counterbore having annular seals positioned thereon to form an annular chamber in which said axially reciprocable piston reciprocates; and, said actuator housing including pressure ports at either end of said annular chamber to supply pressurized fluid for reciprocation of said piston.

* * * * *